United States Patent
Ma et al.

(10) Patent No.: US 11,030,082 B1
(45) Date of Patent: Jun. 8, 2021

(54) APPLICATION PROGRAMMING INTERFACE SIMULATION BASED ON DECLARATIVE ANNOTATIONS

(71) Applicant: salesforce.com, inc., San Francisco, CA (US)

(72) Inventors: Billy Ma, San Mateo, CA (US); Jules Wada, San Francisco, CA (US); Vandit Garg, Antioch, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/991,972

(22) Filed: Aug. 12, 2020

(51) Int. Cl.
  *G06F 11/36* (2006.01)
  *G06F 8/30* (2018.01)

(52) U.S. Cl.
  CPC .......... *G06F 11/3664* (2013.01); *G06F 8/313* (2013.01)

(58) Field of Classification Search
  None
  See application file for complete search history.

(56) References Cited

U.S. PATENT DOCUMENTS

| | | | |
|---|---|---|---|
| 9,280,686 B1* | 3/2016 | Fuller | H04L 67/2804 |
| 9,959,198 B1* | 5/2018 | Jha | G06F 11/3664 |
| 10,089,219 B1* | 10/2018 | Bates | G06F 9/451 |
| 2006/0190923 A1* | 8/2006 | Jubran | G06F 9/44589 |
| | | | 717/104 |
| 2011/0264961 A1* | 10/2011 | Hong | H04L 43/50 |
| | | | 714/38.1 |
| 2011/0307860 A1* | 12/2011 | Park | G06F 11/3696 |
| | | | 717/107 |
| 2017/0300402 A1* | 10/2017 | Hoffner | G06F 11/3664 |
| 2020/0233787 A1* | 7/2020 | Battaglia | H04L 67/10 |
| 2020/0394122 A1* | 12/2020 | Burde | G06F 11/3692 |

OTHER PUBLICATIONS

Amazon, "Create a REST API with a mock integration in Amazon API Gateway," Date Unknown, seven pages, [Online] [Retrieved on Dec. 8, 2020] Retrieved from the Internet <URL: https://docs.aws.amazon.com/apigateway/latest/developerguide/apigateway-getting-started-mock.html>.

Apollo Docs, "Mocking: Mock your GraphQL data based on a schema," Date Unknown, eight pages, [Online] [Retrieved on Dec. 8, 2020] Retrieved from the Internet <URL: https://www.apollographql.com/docs/apollo-server/testing/mocking/>.

Apollo Docs, "The Apollo platform: Bring your data graph from prototype to production," Date Unknown, seven pages, [Online] [Retrieved on Dec. 8, 2020] Retrieved from the Internet <URL: https://www.apollographql.com/docs/intro/platform/>.

(Continued)

*Primary Examiner* — Philip Wang
(74) *Attorney, Agent, or Firm* — Fenwick & West LLP

(57) ABSTRACT

An application programming interface (API) simulator generates synthetic responses for use during development and testing of subsystems. The API simulator receives an API schema including annotations that specify constraints on the synthetic responses. The API simulator generates synthetic responses as results of APIs that conform to the constraints specified using the annotations. The use of API simulator allows testing of subsystems using realistic synthetic responses that satisfy specific constraints as specified using annotations of the API schema.

20 Claims, 7 Drawing Sheets

(56) References Cited

OTHER PUBLICATIONS

MockServer, "MockServer: Easy mocking of any system you integrate with via HTTP or HTTPS," Date Unknown, nine pages, [Online] [Retrieved on Dec. 8, 2020] Retrieved from the Internet <URL: https://www.mock-server.com/>.
Mulesoft, "Simulate API Calls with the Mocking Service," Date Unknown, four pages, [Online] [Retrieved on Dec. 8, 2020] Retrieved from the Internet <URL: https://docs.mulesoft.com/design-center/design-mocking-service>.
Soapui, "API Mocking: Best Practices & Tips for Getting Started," Date Unknown, five pages, [Online] [Retrieved on Dec. 8, 2020] Retrieved from the Internet <URL: https://www.soapui.org/learn/mocking/what-is-api-mocking/>.
WireMock, "WireMock: Mock your APIs for fast, robust and comprehensive testing," Date Unknown, three pages, [Online] [Retrieved on Dec. 8, 2020] Retrieved from the Internet <URL: http://wiremock.org/>.

\* cited by examiner

APPLICATION PROGRAMMING INTERFACE SIMULATION BASED ON DECLARATIVE ANNOTATIONS

BACKGROUND

Field of Art

This disclosure relates in general to application programming interface (API) simulators used for development and testing of software components, and in particular to API simulators that use declarative annotations to constrain the generated synthetic responses.

Description of the Related Art

Computing environments have become increasingly complex and distributed. A computing system interacts with multiple other systems in a computing environment to perform a computation. For example, a system generating a webpage for providing to a client device may invoke APIs of different services to generate different components of the web page. Each API may be invoked using a different protocol and may return results in a different formal. As a result, development and testing of computing systems has become complex.

Developers often use mock values as results of APIs for development and testing purposes instead of invoking an actual API. For example, an API that performs a neural network computation may be highly computation intensive. Instead of using computing resources to perform the computation, the developer may generate random mock API responses and use them instead of the neural network computation. These mock values may allow simple testing of instructions of subsystems, for example, using a development environment or a debugger.

However, these values can only be used for limited testing. For example, if these values are used to generate values that are further provided as input to a target subsystem, the target subsystem may not be able to process these random mock values. For example, the target subsystem may expect valid values for processing instead of random mock values. As a result, integration testing of complex computing environment may be difficult using random mock values. Accordingly, conventional techniques for generating mock values for APIs allow limited support for development and testing of subsystems.

Figure 1A:
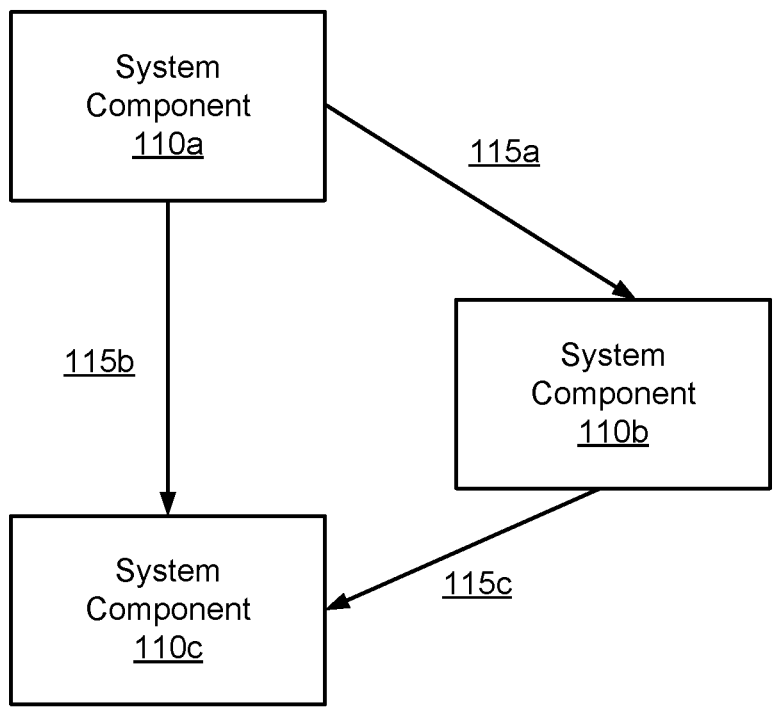
FIGS. 1A-B show block diagrams illustrating use of an API simulator, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Developers often use synthetic responses as results of an API for development and testing purposes instead of invoking an API. A synthetic response is also referred to herein as a mock result or a mock value. A system may include multiple subsystems, each of which being developed simultaneously. Each subsystem may invoke other subsystems that may not be developed and fully functional. Therefore, mock values are used during development process until the other subsystems are ready to generate actual values. Similarly, an API may be invoked using a third-party system. There may be cost associated with invoking a third-party system. Furthermore, a third-party system may require real values as parameters to be able to process them. For example, a payment API may expect a real account to test code that requires payments. Developers may not have access to such accounts. Even if developers have access to such an account, testing of boundary conditions may require providing extreme values as inputs to the parameters. Providing extreme values to a payment API may require depositing large amounts in a test account which may not be feasible for developers. Therefore, to simplify the development process, development systems often use mock values until the system being developed is ready for testing with third-party systems.

Since a subsystem may interact with multiple other subsystems, values obtained from one subsystem may be provided as input to other subsystems. If randomly generated values are used as output of an API instead of actually invoking the API of a subsystem, the generated values may not be processed correctly by other subsystems that expect specific properties of the values. For example, an API may return a URL that is processed by other subsystems. If the developer uses a randomly generated string instead of a valid URL, the other subsystem will fail if it attempts to access the URL. Even if the mock value conforms to the format of a URL, the other subsystem may expect a specific type of web page upon accessing the URL. If a random URL is generated and provided to the subsystem, the code of the subsystem may fail when it attempts to further process the data obtained by accessing the URL. As a result, several code paths of the system may not be tested properly.

An application programming interface (API) simulator generates synthetic responses for use during development and testing of subsystems. The API simulator receives an API schema including annotations that specify constraints on the synthetic responses. The annotations are specified using a declarative language. The API simulator generates synthetic responses as results of APIs that conform to the constraints specified using the annotations. This provides a developer with control on the types of synthetic responses that are generated by the API simulator, thereby allowing a more realistic testing of the subsystems.

The API simulator receives a description of an API schema. The description of the API schema includes signatures of methods of the API schema. A signature of a method includes (1) a set of input parameters and (2) a schema of a response object. For example, the schema of the response object may specify the attributes of the response object. The response object may be a nested structure such that individual attributes are identified by specifying a path of the attribute in the nested structure.

The description of the API schema further includes annotations representing constraints on the response objects corresponding to each method. Following are examples of constrains on synthetic responses that may be specified using annotations: (1) a collection of values within the response object should be sorted, (2) a collection of values should be paginated so that the number of values returned by each invocation is limited, (3) an attribute of the response object must have a value from a predefined set that may be enumerated or stored in a data store, (4) the value of an attribute of the response object must be determined based on an input parameter of the method, (5) the value of an attribute of the response object must satisfy a format, for example, a format specified using a regular expression or a context free grammar, (4) there may be specific relations between two attributes of the response object, for example, a particular value must always be greater than (or less than) another attribute or input parameter, and so on. The API simulator stores the signatures of the API schema and corresponding annotations.

The API simulator receives a request for invocation of a method of the API schema from a system component. The API simulator receives a request that specifies a set of values for the input parameters of the method. The API simulator accesses the annotations for the method as specified by the API schema. The API simulator generates a synthetic response object for the method invocation. The API simulator may generate values randomly for generating the synthetic response objects, for example, by populating attributes of the response object using random values. However, the API simulator assigns values to the attribute of the response object such that the constraints specified by the annotations of the method are satisfied. The API simulator provides the generated response object as the result of invocation of the method to the software component that requested the values.

Overall System Environment

Figure 1B:
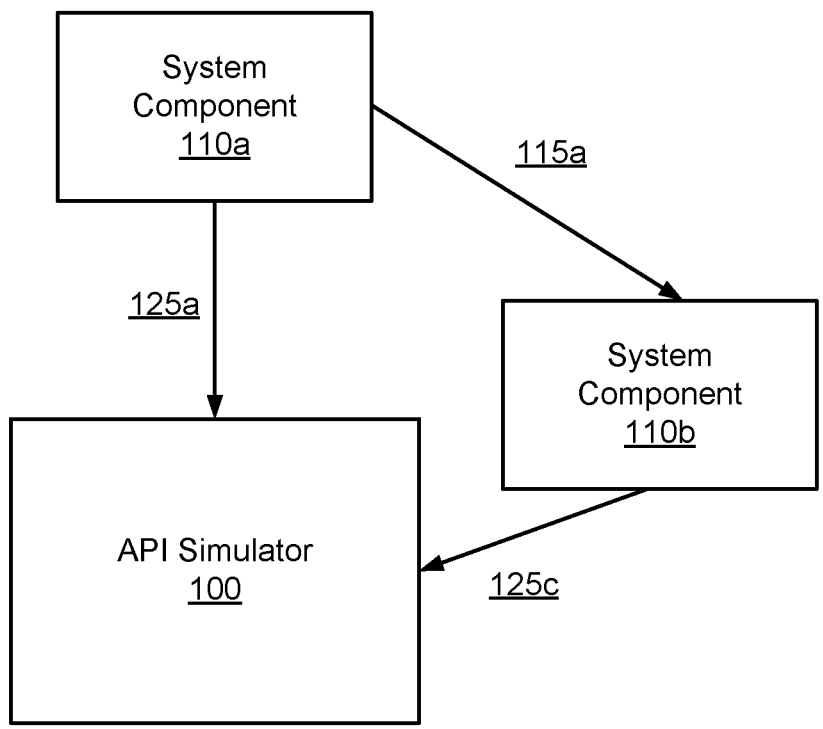

FIGS. 1A-B show block diagrams illustrating use of an API simulator, according to one embodiment. FIG. 1A shows a set of system components 110 interacting with each other via API calls 115. A system component 110 may be a subsystem of a larger system that can execute independent of other subsystems and includes one or more software modules. A system component 110 may also be a software module that provides results to other software modules. A system component 110 may be a service that is invoked by other system component.

A system component 110 provides APIs for allowing other system components 110 to interact with it. A system component 110 interacts with other system components 110 by making API requests. For example, as shown in FIG. 1A, system component 110a invokes 115a an API of system component 110b, system component 110a invokes 115b an API of system component 110c, and system component 110b invokes 115c an API of system component 110c.

Each software component shown in FIG. 1 may execute on one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various software components 110 may be performed via a network, not shown in FIG. 1. In various embodiments, the system components interact using a network that uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

The system components shown in FIG. 1 may comprise computing systems or may run on computing systems. A computing system can be a conventional computer system executing, for example, a Microsoft™ Windows™-compatible operating system (OS), Apple™ OS X, and/or a Linux OS. A computing system such as a client device can be a laptop, desktop, or any device with a display monitor for displaying a user interface.

An API request may be made over the network from one computing system to another. An API request may be made over the internet, for example, using hypertext protocol (HTTP). An API request may be an invocation of a method within the same computing system that does not require transmitting data over a network.

Figure 2A:
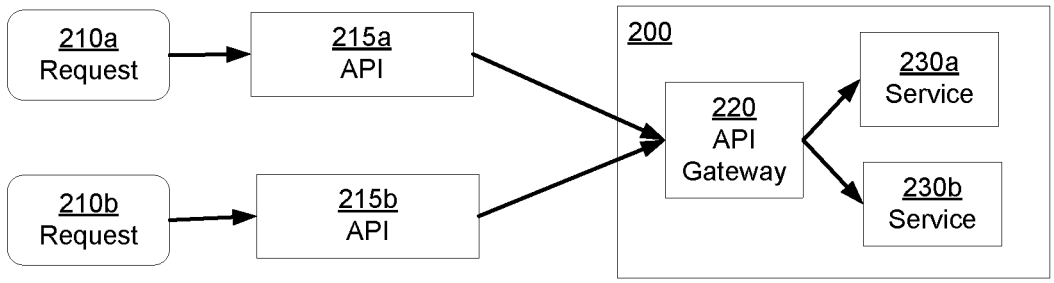
FIGS. 2A-B show a system configuration illustrating use of an API gateway, according to one embodiment.
Figure 2B:
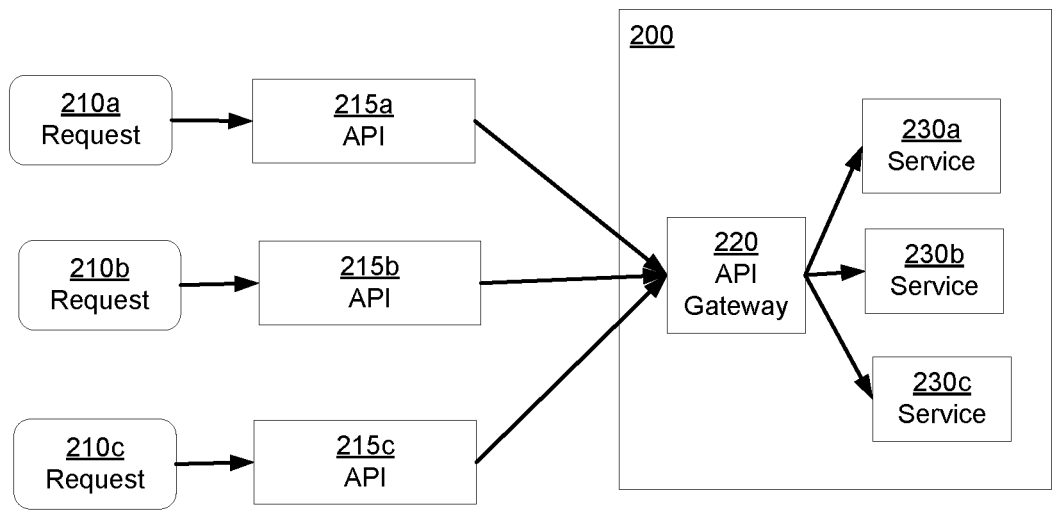

FIGS. 2A-B show system configurations illustrating use of an API gateway, according to one embodiment. The disclosed configuration may be for any system 200 that supports API calls via an API gateway 220. An API gateway is system or a tool that allows a client to interact with a collection of backend services. The API gateway receives application programming interface (API) calls, interfaces with various services, and returns the results based on responses provided by the services.

In an embodiment, the system 200 is an example of a system that uses a micro-service architecture. FIG. 2A shows a configuration allowing an external system, for example, an application to send requests 210 for APIs 215 via the API gateway 220. The application may be a web application that configures web pages to present to a user via a user interface. Accordingly, the web application invokes different APIs to configure different components of a web page, for example, a shopping cart, a web form, content displayed on the webpage and so on.

The system 200 invokes the API using one of the services 230. For example, the request 210a for API 215a may be invoked using the service 230a and the request 210b for API 215b may be invoked using the service 230b.

A developer may want to extend the functionality offered by the system 200. The target configuration of the extended system is shown in FIG. 2B. Accordingly, the developer wants to add a new service 230c that supports API 215c that can be invoked by the external system my making requests 210c. However, adding this additional functionality requires development and testing effort for the service 230c, the API 215c and the application that sends the request.

Figure 3A:
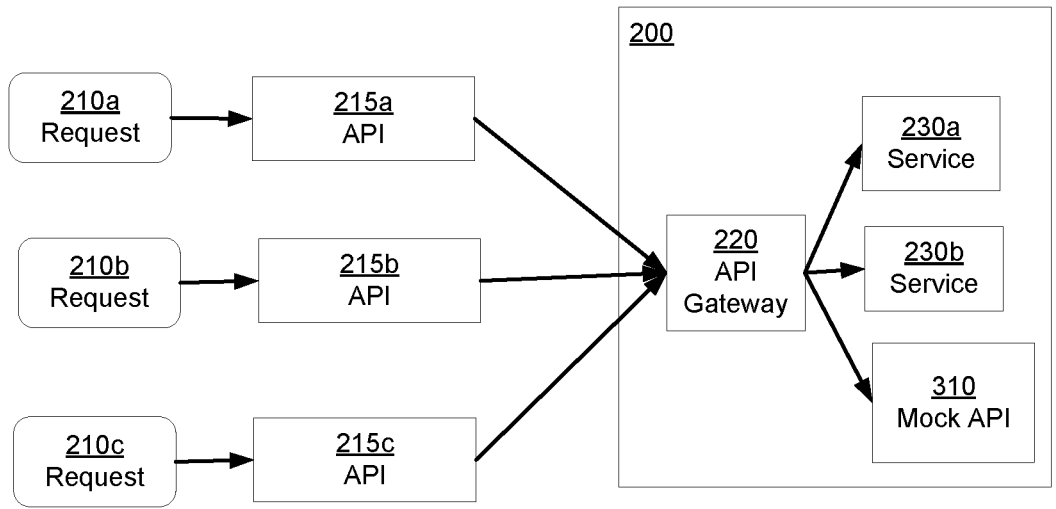
FIGS. 3A-B show a system configuration illustrating use of an API simulator in conjunction with an API gateway, according to one embodiment.
Figure 3B:
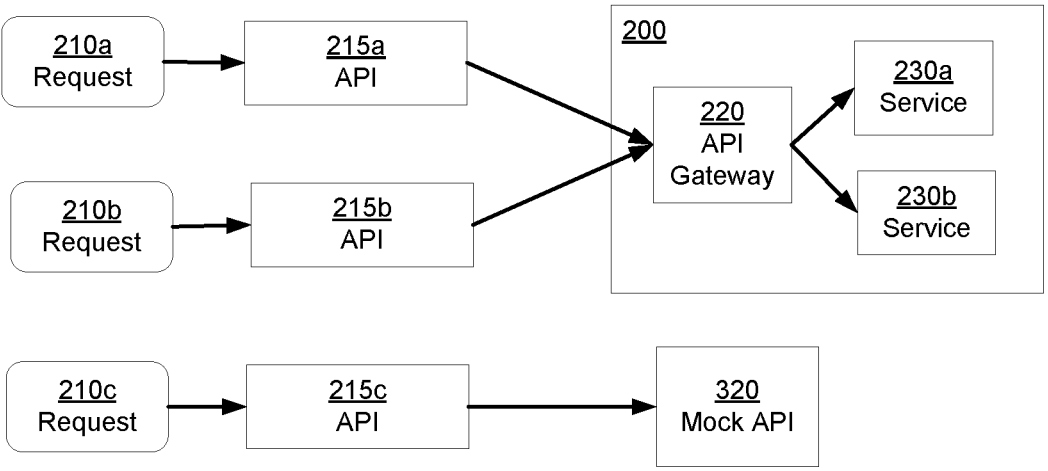

For development and testing of the new service 230c and corresponding API, the developer may invoke mock APIs supported by an API simulator 100. FIG. 3 shows system configurations illustrating use of an API simulator 100 in conjunction with an API gateway, according to one embodiment. For example, FIG. 3A shows a mock API 310 implemented using the API simulator 100 that is invoked via the API gateway 220. FIG. 3B shows a mock API 320 implemented using the API simulator 100 that is invoked without using the API gateway 220. The mock APIs 310 and 320 represent synthetic data services that provide predefined or nondeterministic data in response to API calls.

Conventional mock API implementations have several drawbacks. For example, the values returned by these mock APIs are random and have no relation to the other services. As a result, several aspects of the system are difficult to test. Typically, there are relations between values processed by the different system components. A value provided by one system component may be used by another system component to generate further results. For example, one system component provides a date and another component returns records that have a field that is older than the date. Conventional systems simply generate random values such that values from different system components have no relation to each other.

However, embodiments provide a developer with more control on the type of data returned by the mock APIs. Embodiments allow users to specify relations between various fields of the result of an API call as well as relations between parameters provided as input to an API call and attributes of the synthetic response generated by the API call. The system enforces various constraints in the attributes of the response generated as specified by the user using annotations provided with an API schema. An attribute of a response may also be referred to herein as a field of the response. Embodiments allow a system to be tested under realistic conditions even though the values of the mock APIs represent synthetic responses provided by the API simulator.

In some embodiment, the system components are developed for a tenant of a multi-tenant system. The API simulator 100 may be provided by the multi-tenant system. Various tenants provide API schemas to the API simulator 100 for development and testing of applications that are run by users of the tenant. A multi-tenant system stores data of one or more tenants. Each tenant may be an enterprise or an organization that represents a customer of the multi-tenant system. Each tenant may have multiple users that interact with the multi-tenant system via client devices. Various elements of hardware and software of the multi-tenant system may be shared by multiple tenants. In an embodiment, an application being tested is a tenant application that accesses data stored in the multi-tenant system, for example, in tables of databases of the multi-tenant system. The application may be developed using tools and services provided by the multi-tenant system. The application may invoke services provided by the multi-tenant system, for example, to configure web pages.

In one embodiment, a multi-tenant system implements a web-based customer relationship management (CRM) system. For example, the multi-tenant system may store applications configured to implement and execute CRM software applications. As an example, one tenant might be a company that employs salespersons that use client devices to manage their sales process. Thus, a user might maintain contact data, leads data, customer follow-up data, performance data, goals and progress data, etc., all applicable to that user's personal sales process.

A multi-tenant system includes a data store that stores data for various tenants of the multi-tenant system. It is transparent to tenants that their data may be stored in a data store that is shared with data of other tenants. The data store may store data for different tenants in separate physical structures, for example, separate database tables or separate databases. Alternatively, the data store may store data of multiple tenants in a shared structure. For example, user accounts for all tenants may share the same database table. However, the multi-tenant system stores additional information to logically separate data of different tenants. Accordingly, data of one tenant is kept logically separate from that of other tenants so that one tenant does not have access to another tenant's data, unless such data is expressly shared.

Since a multi-tenant system may store information for several enterprises or organizations, the multi-tenant system needs a large number of servers running a large number of DBMSs. Each DBMS may be shared across multiple tenants. Accordingly, a multi-tenant system needs to implement policies to relocate DBMSs in case of failover to ensure that the DBMSs have very small downtime.

System Architecture

Figure 4:
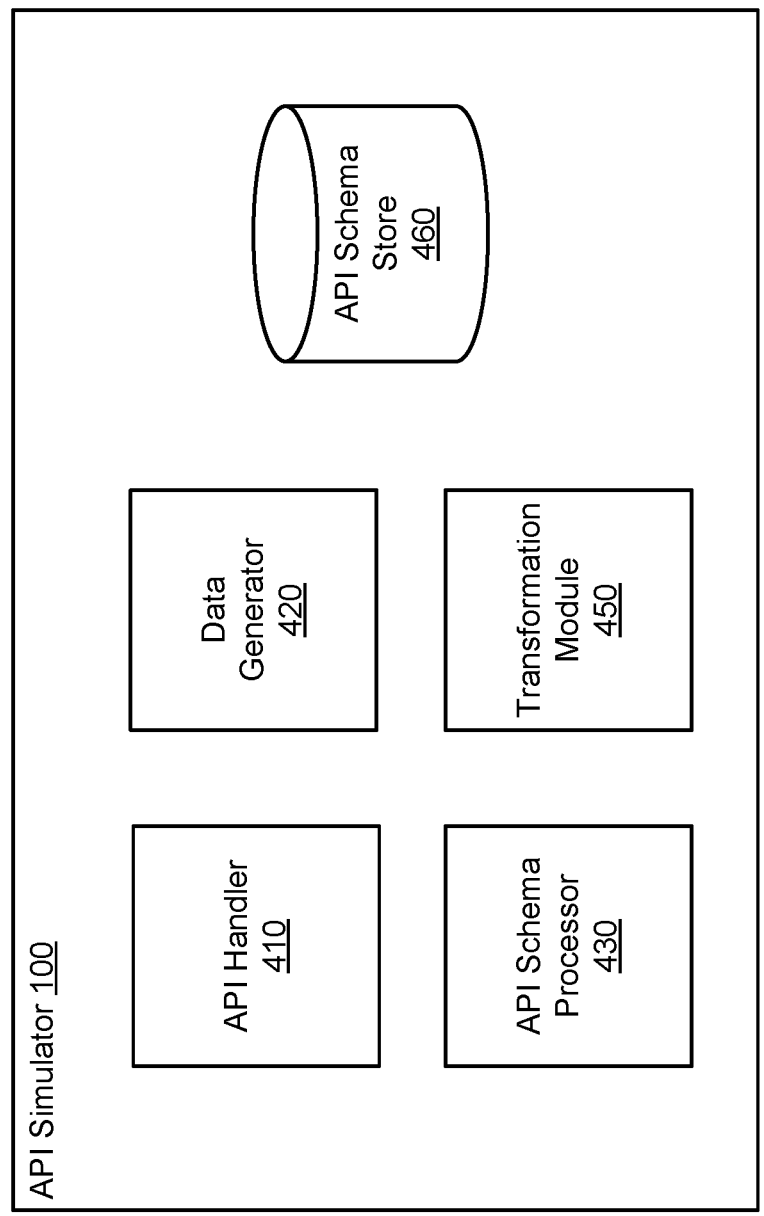
FIG. 4 is a block diagram illustrating components of the API simulator according to one embodiment.

FIG. 4 is a block diagram illustrating components of the API simulator according to one embodiment. The online system 110 comprises an API handler 410, a data generator 420, an API schema processor 430, a transformation module 450, and an API schema store 460. Other embodiments may include more or fewer modules than those shown in FIG. 4. Functionality indicated as being performed by a particular module may be performed by other modules than those indicated herein. Furthermore, steps of any processes described herein can be performed in an order different from that illustrated herein.

The API schema store 460 receives and stores API schemas. The API handler 410 receives requests and determines the method of the API schema being called in the request. The API handler 410 processes the request by generating a synthetic response and providing the synthetic response to the requestor that invoked the API.

The data generator 420 generates the synthetic responses comprising data structures that are returned as results of API requests. The data generator 420 typically generates a nested data structure, for example, a JSON (Javascript object notation) object. Various processes used by the data generator 420 to generate synthetic responses are further described herein.

The API schema processor 430 receives an API schema including annotations and parses the API schema. The API schema processor 430 assimilates the information provided by the API schema using data configurations. Each data configuration includes various methods of the API schema, various types of data objects returned by each method, various types of annotations associated with each method, and so on.

The transformation module 450 transforms the format of the data generated to conform to specific types of APIs. Examples of specific API types include RAIVIL (Restful API Modeling Language), GraphQL query language for specifying APIs, Web Socket API, and so on.

Following are some illustrative examples of different types schemas and the corresponding synthetic responses generated by the data generator 420. The following schema indicates that the result is a phone number and the data type is string. For the following schema, the data generator 420 generates random string values that may not represent a valid phone number.

```
{
  name: Phone,
  type: string
}
```

In some embodiments, the annotation limits the values that can be used by the API simulator for an attribute to a predefined set. The predefined set may be a range of values specified using a minimum and a maximum value, or an enumerated set of predefined values, or the set of values stored in a data store, for example, a column of a database table. Accordingly, the API simulator generates a synthetic response with the attribute value selected from the set of values as specified by the annotation. The annotation may specify that the set of values is determined using an input parameter of the request. For example, the annotation may specify that the minimum or the maximum value may be specified using an input parameter. As another example, the annotation may specify that the name of a column of a table used for selecting the values of an attribute may be specified as a string value passed in as a parameter of the request.

The following schema specifies that the result is a phone number represented as a string and provides examples of the data value. The data generator 420 uses one of the values specified as an example as synthetic response value.

```
{
  name: Phone,
  type: string,
  example: 1800NoSoftware, 555-555-1234, 111-111-1111
}
```

The following schema indicates that the result is a phone number and the data type is string and provides a special data type for phones. For the following schema, the data generator 420 returns valid formatted string values that represent phone numbers.

```
{
  name: Phone,
  type: string,
  context: {
    dataType: phone
  }
}
```

The following schema indicates that the result is a phone number and the data type is string and provides a mapping from fields representing parameters provided as part of the request to the attributes of the data structure representing the synthetic response. The fieldMapping specification maps a field value to a target value. More specifically, the fieldMapping maps a field represented by body.phone parameter provided as part of the request to a target represented by the phone attribute of the object being returned as a synthetic response. Accordingly, the data generator 420 returns a data structure that uses parameters received as part of the request to determine attributes of the data structure returned.

```
{
  fieldMapping: {
    field: body.phone,
    target: phone
  }
  name: Phone,
  type: string
  context: {
    dataType: phone
  }
}
```

The field mapping may specify an expression or a mathematical function such that the target attribute is determined as an expression or function of one or more field values representing parameters of the request.

In an embodiment, the annotations of an API schema specify one or more preprocessors and one or more postprocessors for generating a synthetic response. The API simulator executes a preprocessor before populating values of attributes of the synthetic response and executes a postprocessor after populating values of attributes of the synthetic response. An example of a preprocessor is a constraint that specifies that an attribute must equal a parameter of the request. An example of a postprocessor is a constraint that specifies that a set of values must be sorted in a particular order. Accordingly, the annotation specifies a collection of values returned as part of the synthetic response must be sorted based on some criteria, for example, sorted in either increasing or decreasing order. If the synthetic response includes a collection of objects or records, the annotation may identify an attribute of the object or record and the API simulator sorts the objects returned as part of the synthetic response using that attribute.

Overall Process

Figure 5:
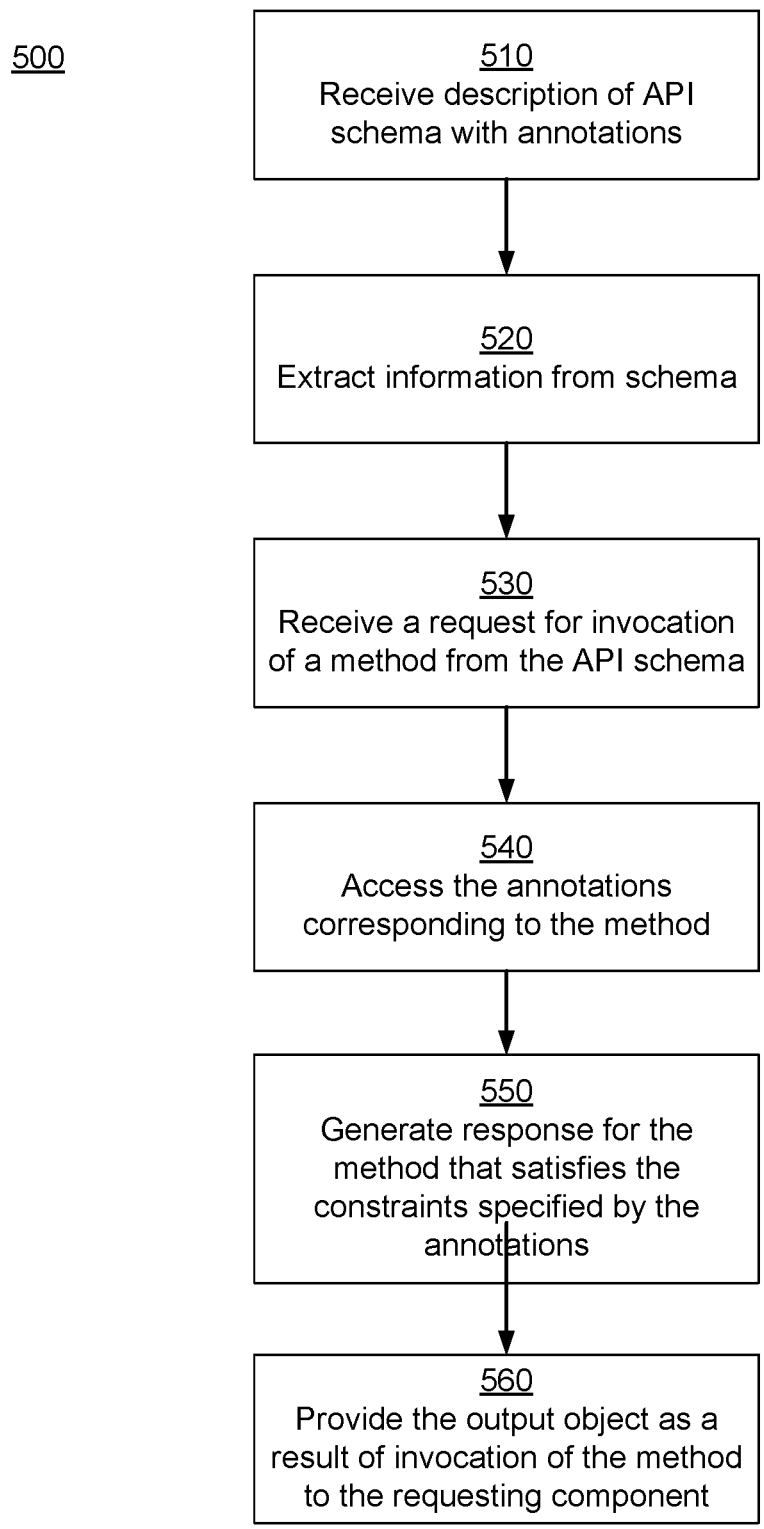
FIG. 5 is a flow chart illustrating the overall process for generating a synthetic response for a method using an API simulator according to one embodiment.

FIG. 5 is a flow chart illustrating the overall process for generating a synthetic response for a method using an API simulator according to one embodiment. Various embodiments can perform the steps of FIG. 3 in different orders than those indicated herein. Moreover, other embodiments can include different and/or additional steps than the ones described herein.

The API simulator 100 receives a description of the API schema including annotations that specify constraints on the synthetic response generated. The API simulator 100 parses the schema and extracts 520 information relevant for generating synthetic responses of methods. This information includes (1) signature of the various methods of the API describing the input parameters of the method and the structure of the response of the method, (2) metadata describing various types that may be returned as part of the response, and (3) the annotations defining constraints on the synthetic response.

The API simulator 100 receives 530 a request for invocation of a method from the API schema. The request may be received from a system component 110, for example, a software module or a computing system. The API simulator 100 identifies the method being invoked by the request and accesses 540 the annotations and other metadata relevant to the method.

The API simulator 100 generates 550 a synthetic response for the method that satisfies the constraints specified in the annotations of the API schema. The API simulator generates the response using the process illustrated in FIG. 5 and described in connection with FIG. 5. The API simulator 100 provides 560 the response as the result of invocation of the method of the API to the system component 110 that sent the API request.

Figure 6:
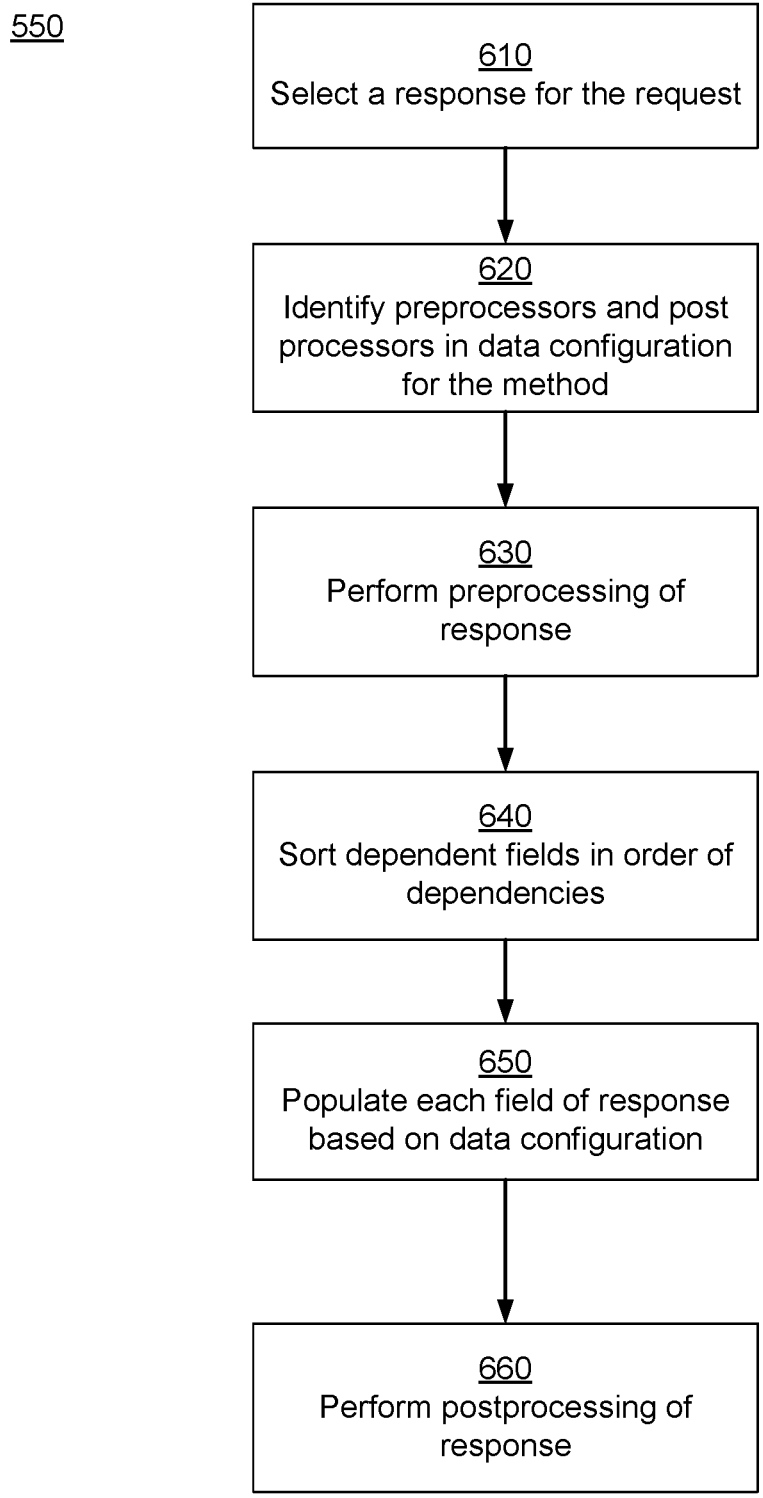
FIG. 6 is a flow chart illustrating the process for generating a synthetic response for a request by an API simulator according to one embodiment.

FIG. 6 is a flow chart illustrating the process for generating a synthetic response for a request by an API simulator according to one embodiment. Various embodiments can perform the steps of FIG. 3 in different orders than those indicated herein. Moreover, other embodiments can include different and/or additional steps than the ones described herein.

The API simulator 100 receives a request for generating a synthetic response for a particular method. The API simulator 100 accesses the metadata describing the API schema including the signature of the method invoked. In an embodiment, the metadata describes one or more types of responses that may be provided in response to the received request. These types of responses correspond to different execution paths of instructions in the method. For example, a particular execution path may return an object of type O1, another execution path may return an object of type O2, and another execution path may return an error message. The API simulator 100 selects 610 a response for the request from the set of candidate responses.

The API simulator 100 identifies 620 the preprocessors and postprocessors for the method based on the API schema. The API simulator 100 performs 630 the preprocessing of the response based on the identified preprocessors. For example, the API simulator 100 may populate certain parameters based on field mappings specified by the API schema.

In an embodiment, the API simulator 100 sorts the dependent fields in increasing order of their dependencies, i.e., least dependent fields first followed by fields with more dependencies. A field represents an attribute of a structure being generated as a synthetic response. Accordingly, the API simulator 100 sorts the fields such that if field F1 depends on field F2, field F2 occurs before field F1 in the sorted order. This ensures that a field F2 that has fewer dependencies is populated before a field F1 with more dependencies since F1 may depend on F2. This allows the API simulator 100 to ensure that the data needed to populate a field is available when the field is being populated. The API simulator 100 populates 650 the fields for the response in accordance with the annotations of the API schema in the sorted order.

The API simulator 100 performs postprocessing 660 of the response based on the annotations of the API schema. For example, the API simulator 100 may sort any fields as specified by the annotations. The API simulator 100 provides the generated response to the system component 110 that requested the synthetic response.

API Simulator Use Case

The API simulator 100 can be used for various types of applications. Following is an example library application that supports APIs to check patron data, reserve items in the library, and so on. Various types of objects are processed by the APIs, for example, a patron object describing patrons, a material object representing material that can be reserved in the library, and so on.

Following is the schema for a patron record. The patron record includes attributes including a name of the patron, an id of the patron, and a history of the material checked out by the patron. The attribute history is a collection of various records, each record describing an action performed by the patron with the library.

patron:
    description: Patron Information
    properties:
      name:
        type: string
      id:
        type: string
      history:
        type: array
        items: checkout A material object represents library material that is checked out. The material object has a materialId identifier. The API schema uses the following structure to define a materialId. The annotation "(context): dataType: entityId options: domains: [Material]" specifies that the data type of a materialId is of a predefined type entityId. The annotation specifies a domain "Material" for the values of entityId. Accordingly, the API simulator 100 generates values for materialId that are limited to values obtained from a column of a database table. In some embodiments, the system generates an identifier with two parts: (1) a prefix that allows users to quickly identity the object represented by a particular row and (2) a unique pattern that represents a unique identifier. For example, an entityId with "Material" may generate a synthetic value that includes the two parts such as "MAT-" representing the prefix concatenated with a 6 digit unique identifier.

materialId:
    type: string
    (context):
      dataType: entityId
        options:
          domains: [Material]

An item that is checked out has a due date. The API schema specifies the following annotations indicating to the API simulator that any generated value used as dueDate type must be a date in the past. The annotation "after: checkoutDate" specifies that the value of dueDate must occur after a checkoutDate value. The field checkout Date represents the date a library patron checked out a library material and is an attribute of checked out record. A checked-out record has attributes including a material ID, a patron ID, a checkout date, a due date, a return date, and fine imposed. The API simulator 100 processes the annotation by obtaining the value of checkoutDate attribute and generating a random date value that is before the current date and after checkoutDate.

dueDate:
    type: datetime
      (context):
      type: pastDate
        options:
          after: checkoutDate Following is an example of annotation used for a value costToReplace that represents an amount that the patron pays if a library item is misplaced. The annotation "options: maxMoney: 10000 minMoney: 1" specifies a range of values including a maximum value maxMoney and a minimum value minMoney. Accordingly, the API simulator generates random values representing money that are within the specified range for use as synthetic response.

costToReplace:
    type: number
    (context):
      dataType: money
      options:
        maxMoney: 10000
        minMoney: 1

Following is an example of portion of API schema for a "patron" request that allows an application to retrieve information describing a patron of the library. The information describing the patron includes material of the library that is checked out by the patron.

```
/patron:
  /{patronId}:
    (fieldMapping):
      field: patronId
      target: patron.id
    displayName: Patron Service
    description: Provides information on the request patron
    uriParameters:
      patronId:
        type: string
    get:
```

```
responses:
    200:
        (postProcess):
            'type': sort
            target: checkout.checkoutDate
        description: 'Success response'
        body:
            type: patron
    400:
        description: 'Incorrect Patron Id'
        body:
            properties:
                message: string
```

The patron request API schema illustrates a fieldMapping annotation "(fieldMapping): field: patronId target: patron.id" that maps a parameter of the request represented as field patronId to a target attribute patron.id of a response represented by a patron object. The patron request API schema also includes an annotation "(postProcess): 'type': sort; target: checkout.checkoutDate" representing a postprocessor that specifies that the response should be sorted by the checkout.checkoutDate attribute. If there is a single list in the response, the list is sorted according to the order specified in the annotation. In an embodiment, the annotation identifies the field that needs to be sorted, for example, if there are multiple fields in the response.

Following is an example, of a portion of a request invoking the patron method. The request includes a URL (uniform resource locator) 'https://api.library.demo/v1/' of a library service followed by the name of the method 'patron', followed by a parameter passed to the request, i.e., the patron id PAT-000001 for identifying the patron whose record is being requested. The request may include other portions, for example, a schema identifier for identifying the schema if there are multiple schemas, for example, different schema types for different types of users.

'https://api.library.demo/v1/patron/PAT-000001'

The API simulator 100 extracts the parameters of the request. The API simulator 100 accesses a structure storing all the metadata describing the API schema corresponding to the received request. The API simulator 100 validates the request using the schema.

The API simulator 100 collects all data types and annotations associated with the request. For example, the request to access the patron information is associated with a patron object and checkout objects representing material checked out by the patron. The API simulator 100 accesses all annotations associated with the request according to the API schema. For example, the following list identifies a field-Mapping annotation and a postprocessing annotation that specifies sorting of the checkout records based on checkout date attribute checkout.checkoutDate.

```
{
fieldMapping: [{field: patronId, targret: patron.id} ],
postProcess: [{type: sort, target: checkout.checkout-
    Date}]
}
```

The API simulator 100 determines the types of candidate responses for the request received. For example, for the patron request, the types of responses include a 200 response that returns a patron object and a 400 response that returns an error message.

```
{
200: {type: patron}
400: {message: string}
}
```

The API simulator 100 extracts the parameters of the request. For example, the API simulator determines that the request has a parameter patronId: 'PAT-000001'.

The API simulator 100 builds a data configuration for the response representing a data structure representing all the information extracted including the data types, annotations, and so on. Following is an example of the data configuration for the patron request including all the data types ("customTypes"), annotations ("annotations"), candidate responses ("responses") and parameters of the request ("requestData").

```
{
customTypes: [{patron: . . . }, {checkout: . . . }],
annotations: {fieldMapping: [{field: patronId, target:
    patron.id}],
    postProcess: [{type: sort, target: checkout.checkout-
        Date}]}
responses: [200: {type: patron}, 400: {message: string}],
requestData: {parameters: {patronId: 'PAT-000001' },
    headers: { }, states: { }}
}
```

The API simulator 100 validates the data configuration to make sure there is no missing information or conflicting types. For example, a constraint may specify that a field must have a particular type of prefix and another constraint may specify a different prefix. The system is not able to satisfy both constraints and therefore reports this inconsistency and identifies the field that is relevant and the conflicting constraints. As another example, an annotation may use an attribute for a type that does not exist in the type declaration. The API simulator reports such inconsistencies.

The API simulator generates a response, for example, the following response.

```
{
name: John Doe,
id: PAT-000001,
dues: 0,
history: [
    {materialId: MAT-000002, patronId: PAT-000001, fine:
        0, checkoutDate: 1/1/2019, returnDate: 3/1/2019,
        dueDate: 3/10/2019},
    {materialId: MAT-000003, patronId: PAT-000001, fine:
        0, checkoutDate: 12/1/2018, returnDate: 1/1/2019,
        dueDate: 1/10/2019}
]
}
```

The API simulator performs postprocessing, for example, sort the records of the history list according to the checkoutDate as specified by the API schema.

```
{
name: John Doe,
id: PAT-000001,
dues: 0,
history: [
    {materialId: MAT-000003, patronId: PAT-000001, fine:
        0, checkoutDate: 12/1/2018, returnDate: 1/1/2019,
        dueDate: 1/10/2019},
    {materialId: MAT-000002, patronId: PAT-000001, fine:
        0, checkoutDate: 1/1/2019, returnDate: 3/1/2019,
        dueDate: 3/10/2019}
]
}
```

In some embodiments, the API simulator receives annotations that allow data of a method to be stored in a context for use by other methods. The API simulator supports different scope for contexts. The scope determines how long a context lives. Examples of scope are request, session, and global. A request context is stored only for a specific request.

A session context is stored and used for all requests with the same session identifier. A global context is stored and used for all requests across multiple session identifiers.

An API may specify following attributes in a "state" annotation for preserving state of certain data: (1) a field annotation that identifies a field of the API, (2) a scope of the context, for example, global context or session context, and (3) a type of operation, for example, whether the API should update the state in the context, get the state from the context, or delete the state in the context. The operation field may not be specified if the operation can be determined based on the API schema. Following is an example of a state annotation that uses global context for storing a material field.

```
(state):
  fields: material
  scope: global
```

The above state annotation may be used in an API that accesses material as follows. Accordingly, a "material" API when invoked, stores the material record obtained in a global context.

```
/material:
  /{materialId}:
    (state):
      fields: [material]
      scope: global
    displayName: Material Service
    description: Provides information on the requested material
    uriParameters:
      materialId:
        type: string
...
```

Following is an example of a state annotation that uses session context for storing a patron field. Accordingly, a "patron" API when invoked, stores the patron record obtained in a context.

```
/patron:
  /{patronId}:
    (state):
      fields: [patron]
      scope: session uriParameters:

patronId:
        type: string
...
```

The API simulator allows APIs to be annotated with a "contextAware" annotation that allows interactions between parameters of the API and fields of records stored in the context. The contextAware annotation specifies the following attributes: (1) a targetField attribute that specifies the response fields that use data stored in the context, (2) a targetArgument attribute that specifies the arguments in the request that affect the data generation process. The API simulator also supports different types of "behavior" for contextAware annotation. A behavior attribute determines the type of constraints following by the data generation process, for example, mirror, mirrorunique, and unique. A mirror behavior specifies that the API simulator should directly copy the value from the request, session or global context. A mirrorunique behavior specifies that the API simulator should copy back values from request, session or global contexts but ensure that the values are unique. A unique behavior specifies that the API simulator should ensure that all values in the response are unique. The contextAware annotation may specify the operation if the operation cannot be determined based on the schema, for example, update, delete, get.

```
(contextAware):
  targetField: [String]
  operation: [update, delete, get]
  behavior: [mirror, mirrorunique, unique . . . ]
  scope: [request, session, global]
  targetArgument: [String]
```

Following is an example of a reserve API that uses a contextAware annotation to update material.condition field of a material record in the context to the value of reserve.status in the global context.

```
/reserve:
  /{materialId}/{patronId}:
    (contextAware):
      targetField: material.condition
      operation: update
      behavior: mirror
      scope: global
      targetArgument: reserve.status
    uriParameters:
      materialId:
        type: string
      patronId:
        type: string
    The
```

Following are example records that may be stored in the context upon invocation of certain APIs. The API simulator receives a request with "material" method, for example, "GET/material/MAT-000001", and saves the following record in the global context. This record includes information for a library material, for example, a book. Since the scope of the "state" attribute of the material method above is global, the record is stored in global context.

| Type | id | name | condition | available | costToReplace | type |
|---|---|---|---|---|---|---|
| Material | MAT-000001 | A Brave New World | available | TRUE | 67.89 | Book |

The API simulator further receives a request "GET/patron/PAT-000001" that specifies the record "patron" to be saved in session context and accordingly saves the following record in the session context.

| Type | id | name | dues |
|---|---|---|---|
| Patron | PAT-000001 | John Doe | 0 |

The API simulator further receives a request "POST/reserve/MAT-000001/PAT-000001" that specifies that the material identified by material ID MAT-000001 should be reserved for patron with patron ID PAT-000001. The API simulator processes the contedxtAware annotation by updating the material.condition field of the material stored in the global context based on a parameter reserve.status of the request. Also, the API simulator updates any dependent fields that need to be recomputed as a result of the modification to the condition field. For example, the "available" field is changed from TRUE to FALSE.

| Type | id | name | condition | available | costToReplace | type |
|---|---|---|---|---|---|---|
| Material | MAT-000001 | A Brave New World | Reserved | FALSE | 67.89 | Book |

These are example values. Other examples can include different values, fields, and APIs. These examples illustrate how the annotations can be used to store data in contexts having different scope based on API calls made to the API simulator and then used in subsequent API calls made to the API simulator.

Computer Architecture

Figure 7:
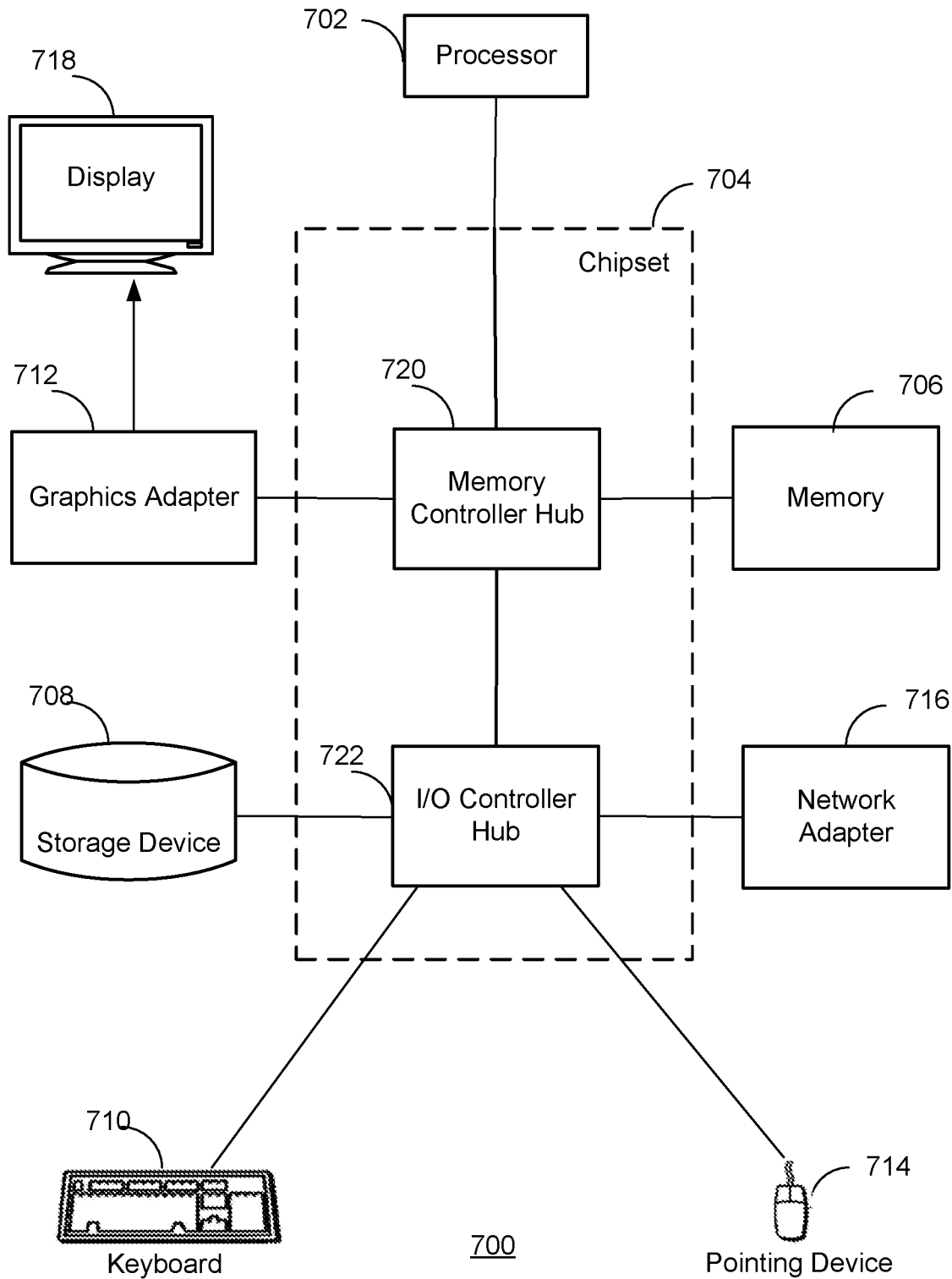
FIG. 7 is a block diagram illustrating the architecture of a typical computer system for use in the environment of FIG. 1 according to one embodiment.

FIG. 7 is a block diagram illustrating the architecture of a typical computer system for use in the environment of FIG. 1 according to one embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is a non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 200. The graphics adapter 712 displays images and other information on the display 718. The network adapter 716 couples the computer system 700 to a network.

As is known in the art, a computer 700 can have different and/or other components than those shown in FIG. 7. In addition, the computer 700 can lack certain illustrated components. For example, a computer system 700 acting as an online system 110 may lack a keyboard 710 and a pointing device 714. Moreover, the storage device 708 can be local and/or remote from the computer 700 (such as embodied within a storage area network (SAN)).

The computer 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 708, loaded into the memory 706, and executed by the processor 702.

The types of computer systems 700 used by the entities of FIG. 1 can vary depending upon the embodiment and the processing power used by the entity. For example, a client device 104 may be a mobile phone with limited processing power, a small display 718, and may lack a pointing device 714. The online system 110 in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for application programming interface (API) simulation, the method comprising:
   receiving, by an application programming interface (API) simulator, a description of an API schema comprising a set of methods, the description comprising, for each method:
   (1) a set of input parameters,
   (2) a schema of a response object, and
   (3) one or more annotations, each annotation representing a constraint on the response object of the method, at least one annotation specifying a constraint based on an input parameter;
   receiving, by the API simulator, a request for an invocation of a method of the API schema, the request specifying a set of values for input parameters of the method;
   accessing, by the API simulator, the one or more annotations for the method as specified in the description of the API schema;
   generating, by the API simulator, a synthetic response object for the method invocation, the generating comprising, assigning a value to each attribute of the synthetic response object, wherein the assigned value satisfies constraints specified by the one or more annotations; and
   providing, by the API simulator, the synthetic response object as a result of the invocation of the method.

2. The computer-implemented method of claim 1, wherein generating the synthetic response object comprises determining a value of an attribute of the object as a function of the input parameter.

3. The computer-implemented method of claim 1, wherein the synthetic response object comprises a set of values, wherein the generating the synthetic response object comprises limiting the number of elements in the set of values based on the input parameter.

4. The computer-implemented method of claim 1, wherein the synthetic response object comprises a set of values, wherein the generating the synthetic response object comprises sorting elements of the set of values in an order determined by the input parameter.

5. The computer-implemented method of claim 1, wherein generating the synthetic response object comprises setting a value of an attribute of the object to the value of the input parameter.

6. The computer-implemented method of claim 1, wherein the synthetic response object is a nested object and the annotation identifies an attribute of the synthetic response object by specifying a path of the attribute within the nested object.

7. The computer-implemented method of claim 1, wherein the synthetic response object comprises a set of values and the annotation specifies pagination of the set of values based on a limit, wherein generating the synthetic response object comprises generating a set of values having a cardinality matching the limit.

8. The computer-implemented method of claim 1, wherein the annotation identifies an attribute of the object and a source of data, wherein generating the synthetic response object comprises setting the attribute of the synthetic response object based on one or more values obtained from the source of data.

9. The computer-implemented method of claim 1, wherein the annotation identifies an attribute of the object and identifies an enumerated list of values, wherein generating the synthetic response object comprises setting the attribute of the synthetic response object based a value obtained from the enumerated list of values.

10. The computer-implemented method of claim 1, wherein the annotation specifies a format for an attribute of the response object, the format specified using an expression.

11. The computer-implemented method of claim 1, method for application programming interface (API) simulation, further comprising:
    sorting attributes of the synthetic response based on the dependencies in the attributes; and
    populating the attributes according to the sorted order.

12. The computer-implemented method of claim 1, further comprising:
    receiving, by an application programming interface (API) simulator, a second specification describing a signature of the method and a second annotation;
    receiving, by the API simulator, a second request for invocation of the method, the second request specifying the set of values; and
    generating a second synthetic response object conforming to the constraint based on the second annotation.

13. The computer-implemented method of claim 1, wherein the annotation is specified using a declarative language.

14. A non-transitory computer readable storage medium for storing instructions that when executed by a computer processor cause the computer processor to perform steps for performing predictions, the steps comprising:
    receiving, by an application programming interface (API) simulator, a description of an API schema comprising a set of methods, the description comprising, for each method:
    (1) a set of input parameters,
    (2) a schema of a response object, and
    (3) one or more annotations, each annotation representing a constraint on the response object of the method, at least one annotation specifying a constraint based on an input parameter;
    receiving, by the API simulator, a request for an invocation of a method of the API schema, the request specifying a set of values for input parameters of the method;
    accessing, by the API simulator, the one or more annotations for the method as specified in the description of the API schema;
    generating, by the API simulator, a synthetic response object for the method invocation, the generating comprising, assigning a value to each attribute of the synthetic response object, wherein the assigned value satisfies constraints specified by the one or more annotations; and providing, by the API simulator, the synthetic response object as a result of the invocation of the method.

15. The non-transitory computer readable storage medium of claim 14, wherein the synthetic response object comprises a set of values and the annotation specifies pagination of the set of values based on a limit, wherein generating the synthetic response object comprises generating a set of values having a cardinality matching the limit.

16. The non-transitory computer readable storage medium of claim 14, wherein the annotation identifies an attribute of the object and a source of data, wherein generating the synthetic response object comprises setting the attribute of the synthetic response object based on one or more values obtained from the source of data.

17. The non-transitory computer readable storage medium of claim 14, wherein generating the synthetic response object comprises determining a value of an attribute of the object as a method of the input parameter.

18. The non-transitory computer readable storage medium of claim 14, wherein the synthetic response object comprises a set of values, wherein the generating the synthetic response object comprises limiting the number of elements in the set of values based on the input parameter.

19. The non-transitory computer readable storage medium of claim 14, wherein the synthetic response object comprises a set of values, wherein the generating the synthetic response object comprises sorting elements of the set of values in an order determined by the input parameter.

20. A computer system comprising:
a computer processor; and
a non-transitory computer readable storage medium for storing instructions that when executed by a computer processor cause the computer processor to perform steps for performing predictions, the steps comprising:
  receiving, by an application programming interface (API) simulator, a description of an API schema comprising a set of methods, the description comprising, for each method:
    (1) a set of input parameters,
    (2) a schema of a response object, and
    (3) one or more annotations, each annotation representing a constraint on the response object of the method, at least one annotation specifying a constraint based on an input parameter;
  receiving, by the API simulator, a request for an invocation of a method of the API schema, the request specifying a set of values for input parameters of the method;
  accessing, by the API simulator, the one or more annotations for the method as specified in the description of the API schema;
  generating, by the API simulator, a synthetic response object for the method invocation, the generating comprising, assigning a value to each attribute of the synthetic response object, wherein the assigned value satisfies constraints specified by the one or more annotations; and
  providing, by the API simulator, the synthetic response object as a result of the invocation of the method.

* * * * *